United States Patent Office 3,286,006
Patented Nov. 15, 1966

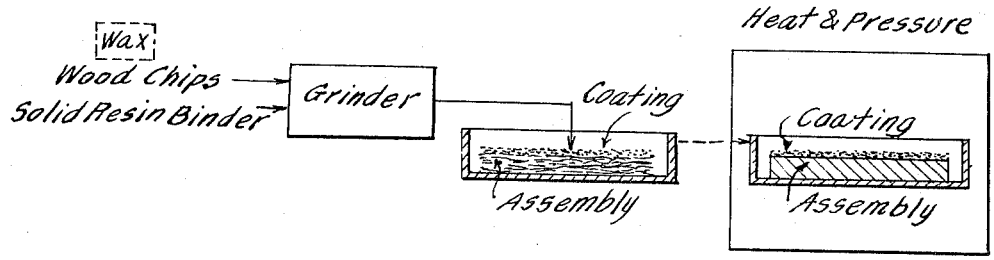
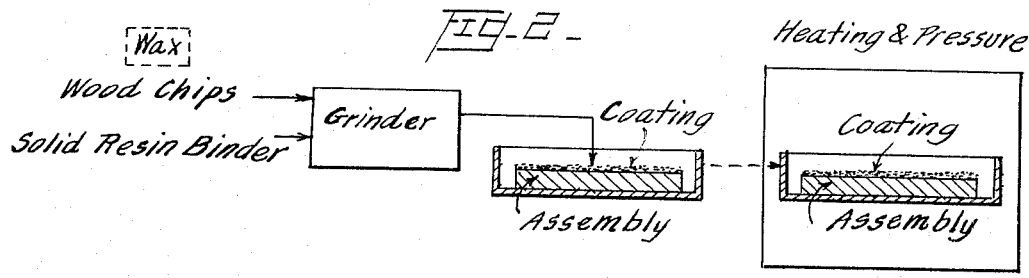
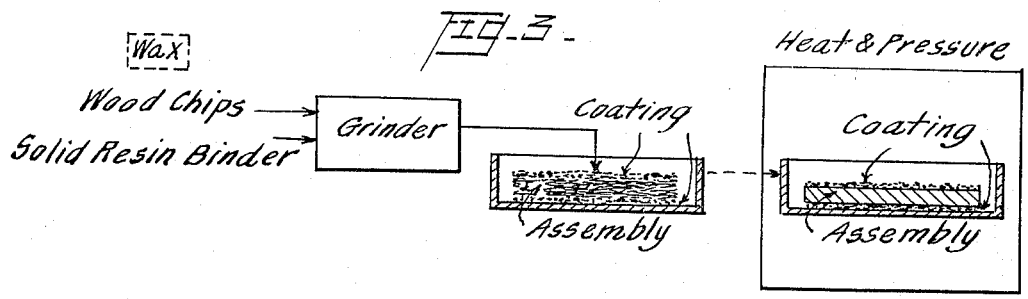

3,286,006
METHOD OF MAKING CHIPBOARD INVOLVING GRINDING TOGETHER A FIBROUS FILLER AND SOLID RESIN
David Logan Annand, 211 Coastal Chambers, 172 Buckingham Palace Road, London, England
Filed Feb. 28, 1963, Ser. No. 261,831
Claims priority, application Great Britain, June 21, 1962, 24,013/62; Aug. 7, 1962, 30,261/62
13 Claims. (Cl. 264—113)

This invention relates to processes for the preparation of chipboard. The word "chipboard" in this specification includes boards, blocks or other bodies comprising wood or other fibrous chips or particles, such as flax or bagasse and a resin binder. Mesh numbers are British Standard throughout.

The invention provides in or for the manufacture of chipboard a process which comprises thoroughly mixing particles of a filler having a mesh number of not less than 20 with solid particles of a resin binder, said solid particles of resin binder being, after mixing, substantially no larger than those of the filler.

The mixing may be achieved by grinding the filler and resin together. The grinding may suitably be effected in a mill, for example a ball mill, a Torrence N.T. mill or an edge runner. Mixing is judged complete when the product has the appearance of a homogeneous powder. Depending on circumstances, this may take from 10 to 20 hours in a ball mill or from 30 to 90 minutes in an edge runner. It is believed that the solid resin binder, being brittle, is broken up into small particles which may be forced into the surface of the filler when the filler is wood or other fibrous material. Hence the particle size of the resin binder before grinding is not of great consequence.

Alternatively solid particles of the resin binder, substantially no larger than those of the filler may be mixed with the filler for example in a paddle-type dry powder mixer. Under these circumstances it is preferred that the solid particles of the resin binder should be smaller than those of the filler.

It is preferred that the particles of filler in the resulting mixture have a mesh number of from 30 to 300, for example from 100 to 200. The filler may be fibrous, either dyed or in its natural colour, for example sawdust or wood flour, flax or coconut fibre, bagasse, ground nut shells or husks of any kind, cotton, corn, vine or heather stalks or papyrus. Alternatively the filler may be a pigment or extender, for example titanium dioxide, ochre or umber, china clay, blanc fixe, whiting in various forms, silica or cement. Again the filler may be a fire proofing agent, for example a boron derivative, asbestos, a phosphate, antimony oxide or a halogenated compound. Other additives such as dyes may be added. The filler may consist of a mixture of these or other similar ingredients.

The resin binder may be a thermosetting resin, for example a urea, phenol or formaldehyde resin or a mixture of such resins. A urea/formaldehyde resin is in common use in the chipboard field and is preferred in this invention. The resin binder may include a hardening agent. Alternatively the heat applied or the acidity of the filler may be employed to effect conversion of the resin without adding a separate hardening agent.

In general the resin is more expensive than the filler and it is desirable to use as little of it as possible consistent with the quality of the product. A chipboard having too low a resin content has a friable surface. When using a liquid resin binder, it is difficult to coat the particles of filler as the particles tend to form aggregates around droplets of the liquid resin. The coated particles are not easy to handle and to lay in an even mat, and a high liquid resin content gives rise to difficulties such as blistering under curing conditions when steam is given off. For these reasons the present process uses solid resin particles preferably in an amount of at least 15% by weight on the weight of filler and resin binder. Higher proportions up to 60% or more may be used, and 25 to 35% have been found useful in many instances.

Water resistance of the chipboard may be improved if a minor proportion of an inert wax is ground together with the filler and resin binder. It is preferred that the wax is a paraffin wax and is added in an amount of from 0.1 to 5% by weight on the weight of filler, resin binder and wax. The wax may be ground in with the resin or may be added in powder or spray form. The invention also includes a mixture of filler and resin binder when prepared by the process described above. This mixture may be used, by methods known per se, in the preparation of sandwich boards having a coarse central layer and two finer surfacing layers.

Another aspect of the invention provides a method of making chipboard which method comprises coating a surface of an assembly of wood chips or particles and a resin binder, before or after curing of said assembly, with the mixture defined above and then curing the coated assembly under pressure so as to form a chipboard having a substantially smooth surface. It is preferred to lay the mixture down in a layer, and to lay the assembly of wood chips or particles and a resin binder before curing in a second layer on top of the first one. This may in turn be covered by a further layer of the ground mixture.

When the resin is a urea, phenol or melamine resin, curing may be effected, at least in part, by heating the coated assembly to a temperature of from 100° C. to 200° C. at a pressure of from 100 to 200 lbs. per sq. in. The curing condition required in any given instance will be apparent to those skilled in the art of chipboard manufacture.

The resulting chipboard has at least one substantially smooth surface which is preferably also hard, non-porous and suitable for printing on direct. Accordingly the invention includes chipboard when made by the above process either with or without a design printed directly thereon. Printing ink, based on, for example, an alkyd or styrenated alkyd resin or similar synthetic medium, may be used for printing the design. The method of printing may be, for example offset photo-gravure to simulate wood grain and the method of application may include silk-screening. The printed chipboard may be lacquered with an air drying or stovable synthetic lacquer or polyester lacquer or other type of glossy or mat finish as required.

If desired, a surfacing tissue such as a resin impregnated paper may be applied to the surface of the board. The tissue may be such as to provide a clear surface for the display of patterns printed on the surfaced board, or may themselves be printed or coloured. It is known to surface chipboard with a plasticlaminate or wood veneer. It has been found that the chipboard of this invention may, in some cases, be satisfactorily surfaced with a veneer only 1/50" thick.

The method of carrying out the invention as described is shown, diagramatically, in the accompanying drawing, wherein:

FIGURE 1 shows the process of preparing a coating, applying it to one surface of an uncured assembly, and curing the assembly and coating;

FIGURE 2 shows a modification of the process of FIGURE 1, wherein the assembly has been cured before being coated; and FIGURE 3 is a further modification of the process of FIGURE 1, wherein both surfaces of the uncured assembly are coated.

Following is a description by way of example of methods in accordance with the invention.

*Example I*

An assembly comprising 92 parts of wood chips and 8 parts liquid urea/formaldehyde resin was prepared and laid down in trays in the usual manner.

Wood flour, whose particles had mesh numbers (British Standard) in the range 100 to 200 was ground for 30 minutes in a Torrence N.T. mixer with 30% of its own weight of powdered solid urea/formaldehyde resin and 1.3% of powdered paraffin wax. The resulting mixture was poured on to the assembly in even thickness across its surface. The loaded trays were heated at a temperature of 150° C., for 5 minutes at a pressure of 150 lb. per sq. in., then for 2½ minutes at 75 lb. per sq. in., and finally under atmospheric pressure for a further 1½ minutes. The cooled board was 18 mm. thick and had a surface which was suitable to receive a printed design direct. The surface layer composed of wood flour and resin was about 2 mm. thick. This process is shown diagrammatically in FIGURE 1.

Substantially the same effect is produced by curing the assembly before applying the mixture of wood flour and resin, except that the boundary is then more sharply delineated. This process is shown diagrammatically in FIGURE 2.

If the chipboard is required to be surfaced on both sides, a layer of the mixture of wood flour and solid resin may be poured into the tray before, as well as after, the assembly of chips and resins as shown diagrammatically in FIGURE 3.

*Example II*

A panel of standard chipboard was surfaced by applying, to one face, a previously ball-milled mixture consisting of:

| | Parts by weight |
|---|---|
| Woodflour 120 mesh | 41.80 |
| Cascamite 6–D [1] | 20.10 |
| Boric acid | 12.28 |
| Powdered paraffin wax having a melting point of 135-140° F. | 0.82 |
| Titanium dioxide | 25.00 |

[1] Cascamite is a Registered Trademark. Cascamite 6–D is a spray-dried urea-formaldehyde resin in powder form.

The assembly was pressed at 150° C. and an initial pressure of 200 lb. per sq. in. for 7 minutes and a chipboard panel having a hard, smooth, even surface about ⅛" thick thereby obtained.

A Bunsen flame was then brought into contact with the smooth surface and the behaviour of the panel noted. After 3 minutes the flame was removed and the panel, although charred, immediately ceased burning.

For purposes of comparison a chipboard panel without the surfacing layer, but otherwise identical to that used above, was also subjected to the same test. After 3 minutes the panel was burning well and continued to do so after the Bunsen flame was removed.

*Example III*

A panel having smooth, even, self-coloured surfaces was produced as follows.

A mixture consisting of:

| | Parts by weight |
|---|---|
| Woodflour 180 mesh | 73.80 |
| Cascamite 6–D | 22.20 |
| Powdered wax M.Pt. 135–140° F. | 0.82 |
| Yellow ochre | 3.18 | was ball-milled for 16 hours and approximately half of the resultant powder spread on to a smooth, polished stainless steel plate to a depth of ⅜". A standard wood chip/resin mixture was then deposited over the layer to a depth of approximately 3". Finally the second half of the pigmented, finely powdered mixture was spread evenly over the surface of the mat and the assembly pressed under the same conditions as in Example II. The resultant board had smooth, self-coloured surfaces which could be printed on directly.

*Example IV*

A board having smooth, white surfaces which could be printed on without further preparation was prepared as in Example III but using, as the surfacing mixture, a mix comprising:

| | Parts by weight |
|---|---|
| Woodflour 120 mesh | 54.5 |
| Cascamite 6–D | 16.4 |
| Powdered wax M.Pt. 135–140° F. | 0.6 |
| Titanium dioxide | 28.5 |

*Example V*

A board prepared as in Example I was spread with a layer of adhesive and a ½₂" thick melamine-resin impregnated paper laminate applied by hot-pressing. After standing for 4 weeks the surface showed no signs of transference of the basic chip pattern through the laminate and remained perfectly flat. For the purposes of comparison a similar paper laminate was applied in the same way to a standard, previously sanded chipboard surface. After standing for 4 weeks the surface was found to show clearly the basic chip pattern that is, it was not completely flat and showed numerous shallow depressions resulting from irregular shrinkage or expansion of the substrate.

The invention is not limited to the embodiment described above. For instance, the chipboard may be formed in a continuous manner rather than in batches, and may be formed by extrusion. Again, the chips used in the preparation of the chipboard base may be of substantially even size or may be graded. In addition some or all of the chips may be pigmented or dyed if desired.

I claim:

1. A method of making a chipboard comprising the steps of preparing an assembly of wood chips and a resin binder, grinding together particles of a fibrous filler, having a mesh number of not less than 20, with solid particles of a resin binder, whereby the solid particles of resin binder are, after grinding, substantially no larger than those of the filler, coating at least one surface of said assembly with the resulting ground mixture, and curing the coated assembly under pressure so as to form a chipboard having at least one substantially smooth surface.

2. A method as claimed in claim 1, wherein the solid particles of resin binder, after mixing, are smaller than those of the filler.

3. A method as claimed in claim 1, wherein the particles of filler in the resulting mixture have a mesh number of from 30 to 300.

4. A method as claimed in claim 3, wherein the particles of filler in the resulting mixture have a mesh number of from 100 to 200.

5. A method as claimed in claim 1, wherein the filler comprises a material selected from the group consisting of wood flour and sawdust.

6. A method as claimed in claim 1, wherein the filler comprises titanium dioxide.

7. A method as claimed in claim 1, wherein the resin binder is a urea/formaldehyde resin.

8. A method as claimed in claim 1, wherein the amount of resin binder used is at least 15% by weight on the weight of resin binder and filler.

9. A method as claimed in claim 1, wherein a minor proportion of an inert wax is mixed together with the filler and resin binder.

10. A method as claimed in claim 9, wherein the wax is a paraffin wax and is added in an amount of from 0.1 to 5% by weight on the weight of the filler, resin binder and wax.

11. A method as claimed in claim 1, wherein the assembly of wood chips or particles and a resin binder is substantially flat, and both surfaces are coated to form a chipboard having two substantially smooth surfaces.

12. A method as claimed in claim 1, wherein the mixture is laid down in a layer and the assembly of wood chips and a resin binder is laid down before curing in a second layer on top of the first one.

13. A method of making chipboard which method comprises grinding together wood flour having a mesh number (British Standard) of from 100 to 200, from 16.4 to 30% by weight on the weight of the wood flour of solid powdered urea/formaldehyde resin and from 0.32 to 1.3% by weight on the total weight of the mixture of paraffin wax, laying the ground mixture down in a first layer, laying a loose assembly of wood chips and resin binder in a second layer on top of the first one, and curing the layers at a temperature of from 100 to 200° C. at a pressure of from 100 to 200 lbs. per sq. in.

References Cited by the Examiner

UNITED STATES PATENTS

| | | |
|---|---|---|
| 1,959,375 | 5/1934 | Loetscher. |
| 2,028,616 | 1/1936 | Loetscher _____ 264—112 XR |
| 2,601,349 | 6/1952 | Welch _____ 264—112 XR |
| 2,630,395 | 3/1953 | McCullough et al. |
| 2,673,370 | 3/1954 | Goss _____ 264—126 XR |
| 2,872,337 | 2/1959 | Heritage et al. ____ 264—112 XR |
| 3,012,901 | 12/1961 | Reese _____ 264—112 XR |
| 3,021,244 | 2/1962 | Meiler _____ 264—112 XR |
| 3,078,510 | 2/1963 | Rowe _____ 264—112 |
| 3,188,367 | 6/1965 | Gottschalk _____ 264—112 XR |

OTHER REFERENCES

Halls, E. E.: "Fillers for Plastics," in Plastics, October 1942, pp. 352–358.

Gould, David F.: "Phenolic Resins," New York, Reinhold, copyright 1959, pp. 62–63.

Herdey, Otto: "Synthetic Resin and Other Additives Used in the Manufacture of Particle Boards," FAO/ECE/Board Cons/Paper No. 4, 18 (1959) pp. 4, 5.

ALEXANDER H. BRODMERKEL, Primary Examiner.

EARL M. BERGERT, Examiner.

P. R. WYLIE, P. E. ANDERSON, Assistant Examiners.